US005579047A

United States Patent [19]

Yamagami et al.

[11] Patent Number: 5,579,047
[45] Date of Patent: Nov. 26, 1996

[54] IMAGE SIGNAL PROCESSING APPARATUS USING COLOR FILTERS AND AN IMAGE PICK-UP DEVICE PROVIDING INTERLACED FIELD SIGNALS

[75] Inventors: Taku Yamagami; Takashi Sasaki, both of Yokohama; Akira Suga, Tokyo, all of Japan

[73] Assignee: Canon Kabushiki Kaisha, Tokyo, Japan

[21] Appl. No.: 284,287

[22] Filed: Aug. 2, 1994

Related U.S. Application Data

[60] Continuation of Ser. No. 166,935, Dec. 15, 1993, abandoned, which is a division of Ser. No. 735,793, Jul. 25, 1991, Pat. No. 5,305,096.

[30]   Foreign Application Priority Data

| Jul. 31, 1990 | [JP] | Japan | 2-204776 |
| Jul. 31, 1990 | [JP] | Japan | 2-204777 |
| Jul. 31, 1990 | [JP] | Japan | 2-204784 |

[51] Int. Cl.⁶ .................................................. H04N 9/64
[52] U.S. Cl. .......................... 348/242; 348/322; 348/282
[58] Field of Search ................................ 348/273–283, 348/242, 322

[56]   References Cited

U.S. PATENT DOCUMENTS

| 3,971,065 | 7/1976 | Bayer | 358/41 |
| 4,131,913 | 12/1978 | Yamanaka et al. | 358/43 |
| 4,205,336 | 5/1980 | Nagumo | 358/43 |
| 4,213,145 | 7/1980 | Nagumo | 358/43 |
| 4,236,176 | 11/1980 | Nagumo | 358/43 |
| 4,450,475 | 5/1984 | Ishikawa et al. | 358/274 |
| 4,700,219 | 10/1987 | Tanaka et al. | 358/43 |
| 4,845,548 | 7/1989 | Kohno et al. | 348/279 |
| 4,939,573 | 7/1990 | Teranishi et al. | 348/277 |
| 5,008,739 | 4/1991 | D'Luna et al. | 358/37 |
| 5,018,006 | 5/1991 | Hashimoto | 348/275 |
| 5,099,317 | 3/1992 | Takemura | 358/44 |

FOREIGN PATENT DOCUMENTS

| 0164255 | 12/1985 | European Pat. Off. | H01L 31/02 |
| 0244655 | 11/1987 | European Pat. Off. | H04N 9/04 |
| 0368614 | 5/1990 | European Pat. Off. | H04N 9/64 |
| 2637145 | 3/1990 | France | H04N 3/15 |
| 2025173 | 1/1990 | Japan . | |

*Primary Examiner*—Stephen Brinich
*Attorney, Agent, or Firm*—Fitzpatrick, Cella, Harper & Scinto

[57]   ABSTRACT

An image signal processing apparatus comprises an image pick-up device driven in an interlaced manner, a color filter having portions for passing luminance components located in an offset manner and a memory for storing the signal read out from the image pick-up device without sub-sampling it.

28 Claims, 10 Drawing Sheets

FIG. 2

| Cy | Y  | Cy | Y  | Cy |
|----|----|----|----|----|
| Y  | Ye | Y  | Ye | Y  |
| Cy | Y  | Cy | Y  | Cy |
| Y  | Ye | Y  | Ye | Y  |

FIG. 3

| R | Y | R | Y | R |
|---|---|---|---|---|
| Y | B | Y | B | Y |
| R | Y | R | Y | R |
| Y | B | Y | B | Y |

FIG. 4
PRIOR ART

| R | G | B |  |
|---|---|---|--|

FIG. 5
PRIOR ART

| Mg | Gr | Mg | Gr |
|----|----|----|----|
| Cy | Ye | Cy | Ye |
| Mg | Gr | Mg | Gr |
| Ye | Cy | Ye | Cy |

FIG. 9
| G | R | G | B |
|---|---|---|---|
| G | B | G | R |
| G | R | G | B |
| G | B | G | R |
FIG. 10(a)
Y
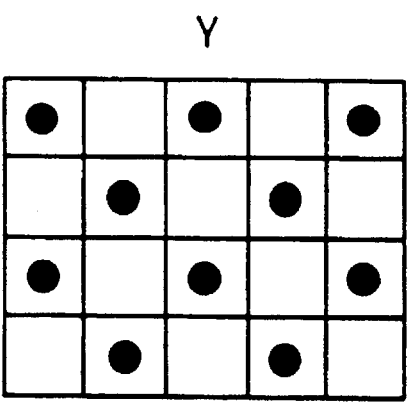
FIG. 10(b)
$C_R$
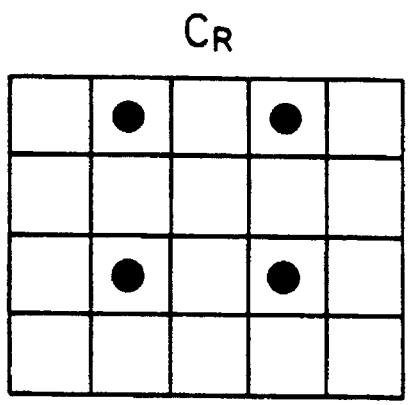
FIG. 10(c)
$C_B$
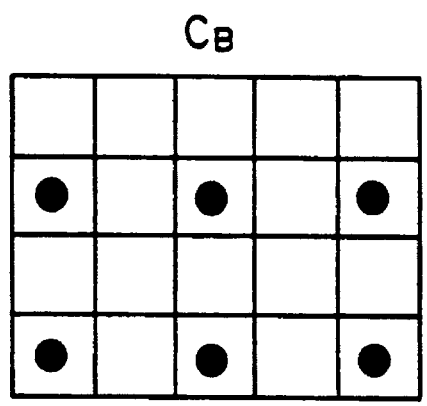

| Y | G | Y | R | Y |
| R | Y | B | Y | G |
| Y | G | Y | R | Y |
| R | Y | B | Y | G |

IMAGE SIGNAL PROCESSING APPARATUS USING COLOR FILTERS AND AN IMAGE PICK-UP DEVICE PROVIDING INTERLACED FIELD SIGNALS

This application is a continuation of application Ser. No. 08/166,935 filed Dec. 15, 1993, now abandoned, which is a divisional of Ser. No. 07/735,793, filed Jul. 25, 1991, now U.S. Pat. No. 5,305,096.

BACKGROUND OF THE INVENTION

1. Field of the Invention

This invention relates to an image signal processing apparatus. More particularly, the present invention relates to an image signal processing apparatus having an image pickup device and a color filter. The invention can be applied, for example, to a camera for capturing an image for still (as opposed to moving) display but is not limited thereto.

2. Related Background of Art

It is known to use a frame transfer type CCD as an image pick-up device, with a stripe color filter as shown in FIG. 4. Other types of filter, such as mosaic types, in which a column of filter portions is not all the same color, can provide improved resolution. FIG. 5 shows an example of a mosaic type filter, and FIGS. 2 and 3 show Bayer-type mosaic filters, known from U.S. Pat. No. 3,971,065. The Bayer-type filter has Y portions which pass a luminance component of an image, arranged in an offset manner which can enable a high resolution to be achieved, e.g. by interpolation from adjacent lines of Y signal. However, mosaic types of filters tend not to work well with a frame transfer type CCD. Under some circumstances there is the possibility with a frame transfer type CCD that there may be some contamination of the charge amount for one pixel by the charge amount for an adjacent pixel in the column direction. Provided that all the pixels in a column represent the same color, this vertical 'smearing' of the read-out signal results in a slight loss of vertical resolution. However, if the pixels represent different colors, so that a charge amount for one color is contaminated by a charge amount for a different color, false color reproduction might result, and this would be less acceptable than a loss of resolution. This problem arises equally with a camera for a still picture and a camera for a moving picture.

Mosaic type filters can be used with other types of image pick-up devices. Some of these, such as an interline-type CCD, can also provide an interlace output signal. Such an interlace output can be advantageous. TV type display devices normally require an interlace type input signal. A frame transfer type CCD outputs its entire image signal in a single destructive read operation. Typically this will provide one field of video signal. For a moving image display, the next field signal can be obtained by exposing the image pick-up device again and reading out the signal again, so that successive fields of video signal come from successive exposures of the CCD. However, for a still video display this will result in a still picture being reproduced from two field signals derived from exposing the image pick-up device at two different times, and so any object which is moving or changing with time will be blurred or otherwise degraded in reproduction. In practice, a single field signal is normally read and stored from a frame transfer type CCD for still video reproduction, and a second field signal is synthesised from the single field signal, e.g. by interpolating between adjacent lines. However, this tends to result in a lower resolution display than one in which both field signals are derived in an interlace manner from a single exposure of the image pick-up device.

An interline type CCD, for example, can be driven in interlace manner so that in a first field only alternate lines of the image pick-up device are read, and in a second field the intervening lines are read. Both fields can be read from a single exposure of the CCD, allowing an interlace output without movement flicker for a still video camera. However, if a Bayer-type filter of FIG. 2 or FIG. 3 is combined with this type of CCD device, the following problems arise.

As shown in FIG. 6, only pixels $Y_1$ and $Y_2$ are used for interpolating the missing luminance signal pixel (shaded in FIG. 6) when reading the second line, because pixels $Y_3$ and $Y_4$ are only read in another TV field period.

If the missing luminance signal is interpolated by using color signals, this will cause zigzag noise at the edge portion of a diagonal line on the screen. This is caused because the carriers of color signals affect the luminance signal. This problem does not depend on the type of CCD used.

In the color processing, the problem arises that each field signal can contain only one type of color. For example in FIG. 2 the first field signal will contain only the cyan color signal and the second field signal will contain only the yellow color signal.

Consequently the interline type of CCD device is not easily used with a Bayer-type filter.

The latter problem will also arise when using the filter of FIG. 5. It can be avoided by using the filter of FIG. 9. With this type of filter the color image signals produced by the CCD device are converted into Y, R, B signals by signal processing. These signals may then be compressed by sub-sampling using the patterns as shown in FIGS. 10(a)–10(c).

However, in this case the image signal processing apparatus has to include a converting circuit for converting the output signals from the CCD device into a luminance signal and color signals, and further it has to include a sub-sampling circuit if sub-sampled signals are desired. These circuits are obstacles to reducing the size or the cost of the apparatus and for improving the quality of an image on the screen.

SUMMARY OF THE INVENTION

An object of the present invention is to provide an image signal processing apparatus which can resolve the above mentioned problems. Another object of the present invention is to provide an image pick-up apparatus having a high quality image with a reduced amount of error.

Still another object of the present invention is to provide an image pick-up apparatus having a high quality image without complicated or expensive circuits.

In one aspect, the present invention provides an image signal processing apparatus in which an image pickup device has a filter with first portions for passing a first component of an image arranged in an offset manner so that one line of the filter has a different arrangement of first portions from another, the output of the image pickup device being processed to produce an interlace-type signal in which a line of the signal is derived from a line of the output of the image pick-up device combined with at least one other line of the output having a different arrangement of first portions.

In another aspect, the present invention provides an image signal processing apparatus in which an image pick-up device has a filter with an offset arrangement of first filter portions, the image pick-up device being read in an interlace manner and signals from adjacent filter rows being combined in the output from the apparatus.

In yet another aspect, the present invention provides an image signal processing apparatus in which an image pickup device has a filter with an offset arrangement of first filter portions, the image pick-up device outputs first and second fields of interlaced image data, a memory means stores image data from the first field, and signal processing means processes image data from the second field with image data from the first field.

The apparatus may be a still video camera or other apparatus for capturing a still picture for display, and the image pickup device may provide two interlaced fields of output from a single exposure.

Preferably the first filter portions are Y or G portions, most preferably Y portions.

In a further aspect of the present invention, an image signal processing apparatus comprises an image pick-up device with a color filter and producing an interlace-type output, the color filter having first lines with first color filter portions for passing a first color component and second lines with second color filter portions for passing a second color component, the first lines lacking second color filter portions and the second lines lacking first color filter portions, and the apparatus having signal processing means which combines different field period signals from the image pick-up device to compensate lines of the signals for the lack of signal portions for the first or second color.

More generally, in an aspect of the present invention a signal processing means compensates an interlace output of an image pickup device for the effects of the interaction between characteristics of the filter and the interlace nature of the output, the processing means combining signal portions from different field periods of the interlace output.

In a yet further aspect of the present invention, an image signal processing apparatus has an image pickup device with a color filter means having luminance filter portions in an offset arrangement, and the output of the image pickup device is in interlaced fields and is stored without subsampling. Preferably the output from the image pick-up device is in a sub-sampled pattern owing to the arrangement of filter portions in the color filter means.

Other and further objects, features and advantages of the invention will be appear more fully from the following description of preferred embodiments, given by way of non-limiting example.

BRIEF DESCRIPTION OF THE DRAWINGS

FIGS. 2 and 3 illustrate color filters which are suitable for use with the apparatus of FIG. 1.

FIGS. 4 and 5 illustrate other color filters for comparison.

FIG. 9 illustrate another comparison color filter.

FIGS. 10(a)–10(c) illustrate a sub-sampling method for use with the color filter of FIG. 9.

DETAILED DESCRIPTION OF THE PRESENT EMBODIMENTS

Figure 1:
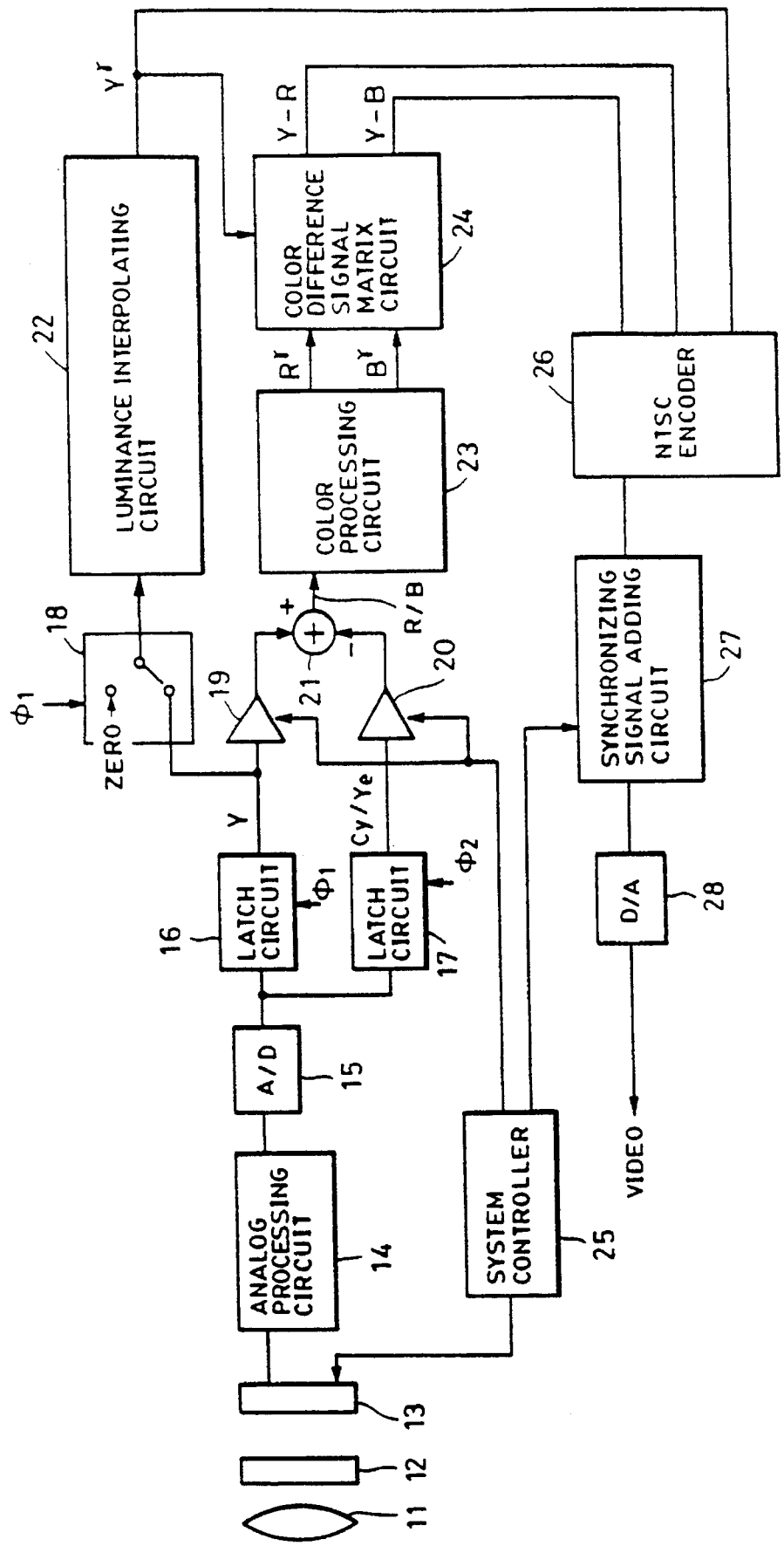
FIG. 1 illustrates a block diagram of the image signal processing apparatus of a first embodiment of the present invention.
Figure 6:
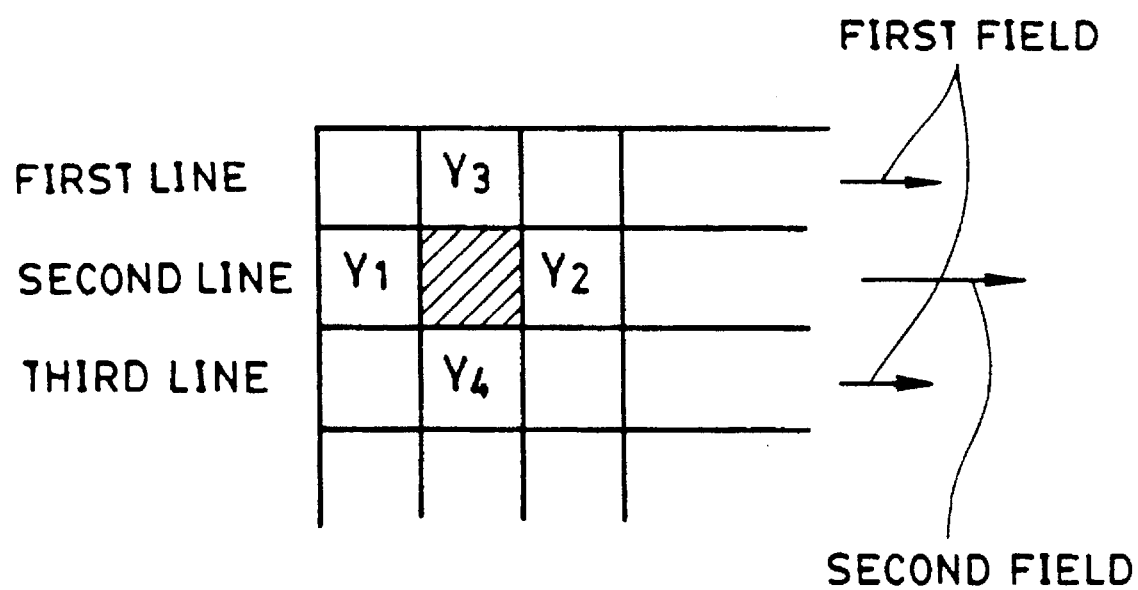
FIG. 6 illustrates a relation between a missing Y signal pixel and surrounding Y signal pixels.

FIG. 1 illustrates a video camera embodying the present invention.

Incident light from a scene passes through a lens 11 and an optical low pass filter 12 to form an optical image on an image pick-up device 13, which converts it into an electric image signal. The image pick-up device 13 has a color filter as shown in FIG. 2 and in this embodiment the image pick-up device 13 is an interline-type CCD.

The electric image signal produced on the image pick-up device 13 is read out in an interlaced manner, and then is processed, such as CDS (Correlated Double Sampling) in an analog processing circuit 14.

The processed signal is converted into a digital signal in an A-to-D converter 15. The digital signal is latched into two latch circuits 16, 17 by respective timing signals $\phi_1$, $\phi_2$. The timing signals $\phi_1$, $\phi_2$ have half the frequency of the pixel frequency of the electric image signal read out from the image pick-up device 13, and have opposite phases, so that alternate pixels of the electric image signal are latched in different latches. Consequently, the latch circuit 16 latches and outputs Y signal pixels and the latch circuit 17 latches and outputs Cy or Ye signal pixels in each field interval.

A switch 18 passes the Y output signal of the latch circuit 16 and a "0" signal alternately, in accordance with the timing signal $\phi_1$. A luminance signal interpolating circuit 22 performs gamma processing and interpolates the missing luminance signal pixels by using a field memory in a manner which will be mentioned later.

Two color difference signals such as R-Y, B-Y are produced in the following manner. Firstly, R and B signals are produced according to the following equations:

$R = kY - \alpha Cy$ $B = cY - \beta Ye$ (k, α, c, β are constants)

This is achieved by passing the Y signal from latch circuit 16 through a multiplier 19 and passing the Cy or Ye signal from the latch circuit 17 through a multiplier 20, and subtracting the output of the latter multiplier 20 from the output of the former multiplier 19 in a subtractor 21.

The coefficients of the multipliers 19,20 are respectively set as k, α during a first TV field period and as c, β during a second TV field period by a controller 25.

The output of the subtractor 21 alternates between R and B in alternate TV field periods. Its subtraction output is provided synchronously with $\phi_1$ or $\phi_2$.

A color processing circuit 23 executes for example interpolating, gamma processing, and processing for missing fields and re-timing on the output of subtractor 21 by using a field memory. The missing fields and re-timing processing receives the field sequential R and B signals, generates the missing R and B fields, and outputs simultaneous R and B signals for each field. In a color difference signal matrix circuit 24 two color difference signals are produced by subtracting Y(gamma) and R(gamma), or Y(gamma) and B(gamma).

These two color difference signals are encoded into interleaved NTSC signal format in an NTSC encoder 26 together with the luminance signal. Synchronizing signals are added in a synchronizing signal adding circuit 27, the signals are converted into analog form in a D-to-A converter 28, and are outputted as an analog video signal.

The present invention can be applied to other signal formats, for example, to the PAL system.

Figure 7:
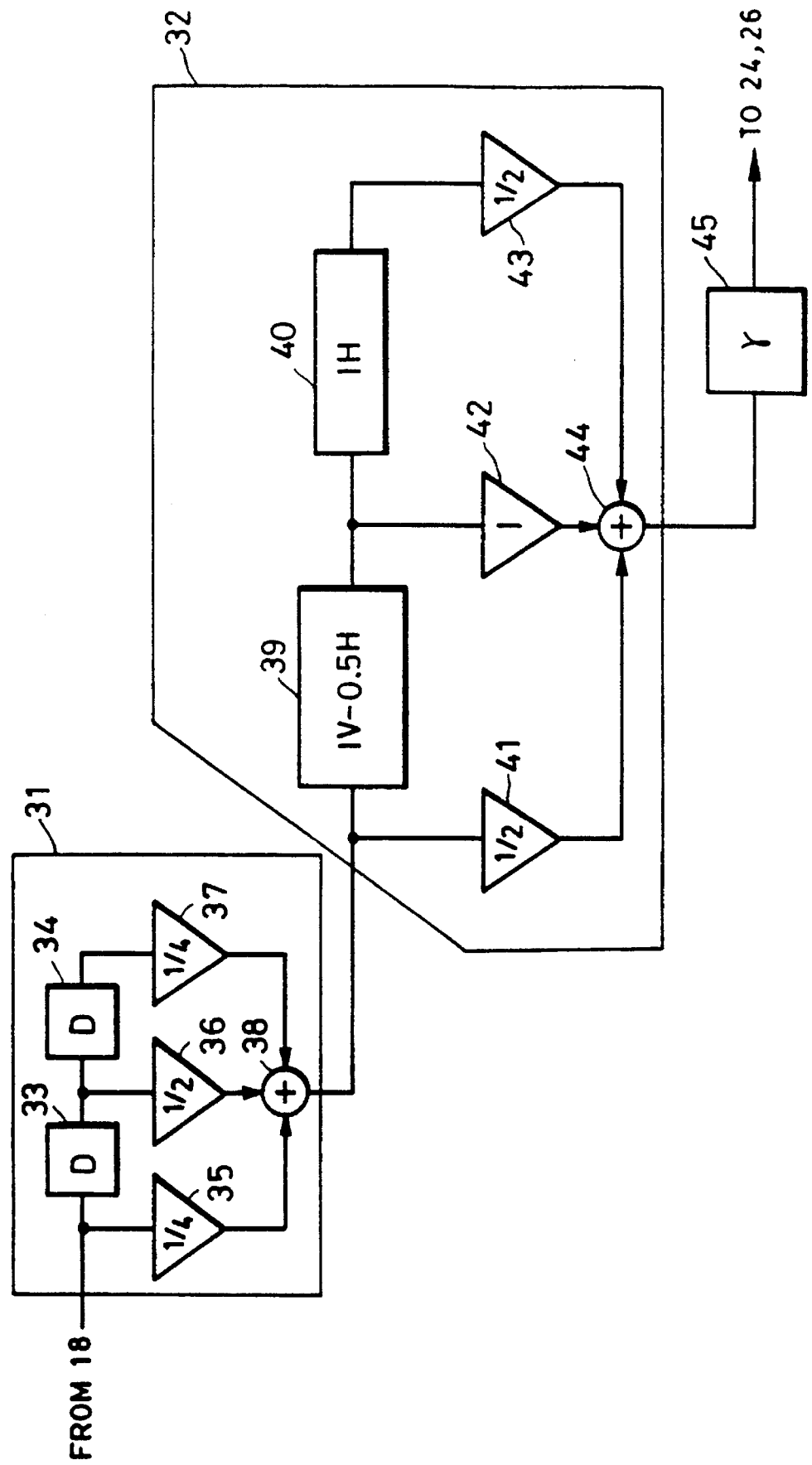
FIG. 7 illustrates an embodiment of a detailed block diagram of a luminance interpolating circuit 22.

FIG. 7 illustrates an example of the luminance signal interpolating circuit 22. In this example, there is a horizontal FIR (Finite Impulse Response) filter 31 and a vertical FIR filter 32 which are cascaded.

The horizontal FIR filter 31 consists of multipliers 35, 36,37, of respective co-efficients [¼, ½, ¼], delay circuits 33,34 and an adder 38, to provide an interpolating low pass filter.

The vertical FIR filter 32 consists of multipliers 41,42,43 having respective co-efficients [½, 1, ½] a field memory 39 having (1 V–0.5H) delay time (i.e. a delay time of half a horizontal period less than a vertical period), a 1H delay memory 40, and an adder 44, to provide an interpolating low pass filter.

Consequently, the two filters 31,32 jointly provide a two dimensional interpolating low pass filter having co-efficients as follows:

$$\begin{bmatrix} 1/8 & 1/4 & 1/8 \\ 1/4 & 1/2 & 1/4 \\ 1/8 & 1/4 & 1/8 \end{bmatrix}$$

The output of adder 44 is subjected to gamma processing in gamma processing circuit 45.

Figure 8:
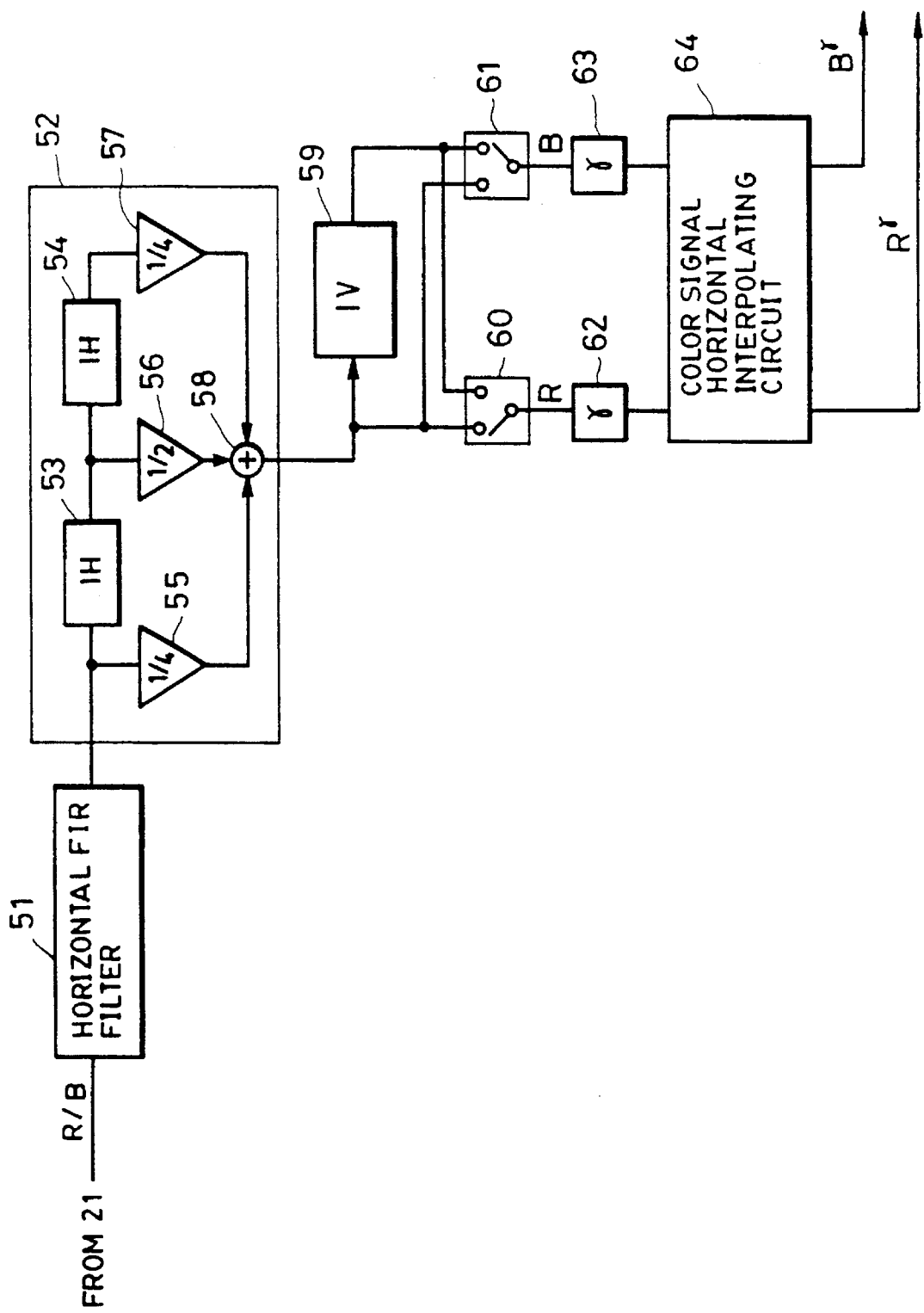
FIG. 8 illustrates an embodiment of a detailed block diagram of a color processing circuit 23.

FIG. 8 illustrates an embodiment of the color processing circuit 23.

Field sequential R and B signals are supplied to a horizontal FIR filter 51 and then to a vertical FIR filter. The signals from the vertical FIR filter are supplied both to a FIFO type memory 59 for delaying them by 1 TV field period and to first terminals of switches 60, 61. The output of the memory 59 is provided to second terminals of the switches 60, 61.

Since an R signal is present at the input to the memory 59 when a B signal is present at the output, and vice versa, both R and B signals are present simultaneously at the switches 60, 61.

These R and B signals are switched by the switches 60,61 once per TV field interval so that the switch 60 continually outputs R signals while the switch 61 continually outputs B signals.

These R and B signals are gamma-converted in gamma-converters 62,63 then are supplied to a color signal horizontal interpolating circuit 64 which interpolates them to double their data rate.

Since the color processing up to this stage is performed synchronously with $\phi_1$ or $\phi_2$, the capacity of the color memory 59 can be half that of the luminance memory 39.

The present invention can adopt other types of color filters such as shown in FIG. 3 instead of FIG. 2. The color filter shown in FIG. 3 consists of primary color filter portions (R or B) and transparent filter portions (Y) so that its color reproduction characteristics are better than those of the filter of FIG. 2, while the light absorbing efficiencies are quite different between the Y and the R/B filter portions so that signals from behind the Y filter portions are apt to saturate preferentially.

In this embodiment the multipliers 19,20 and the adder 21 can be eliminated or they can be used for controlling white balance. In the latter case the output signal of the adder 21 is a color difference signal. This color difference signal is directly supplied to the color processing circuit 23, and the color difference signal matrix circuit 24 is not required.

Some types of image signal processing apparatus such as an electronic still video camera, do not need real time processing, and in such cases the FIFO type memory in FIG. 1 can be replaced by a normal speed type memory.

With this embodiment, no converting circuit is required to provide the Y output signal. Additionally, the luminance signal will have a better resolution than in the case of a circuit using the filter of FIG. 9 since it is not created from a combination of color signals.

Figure 11:
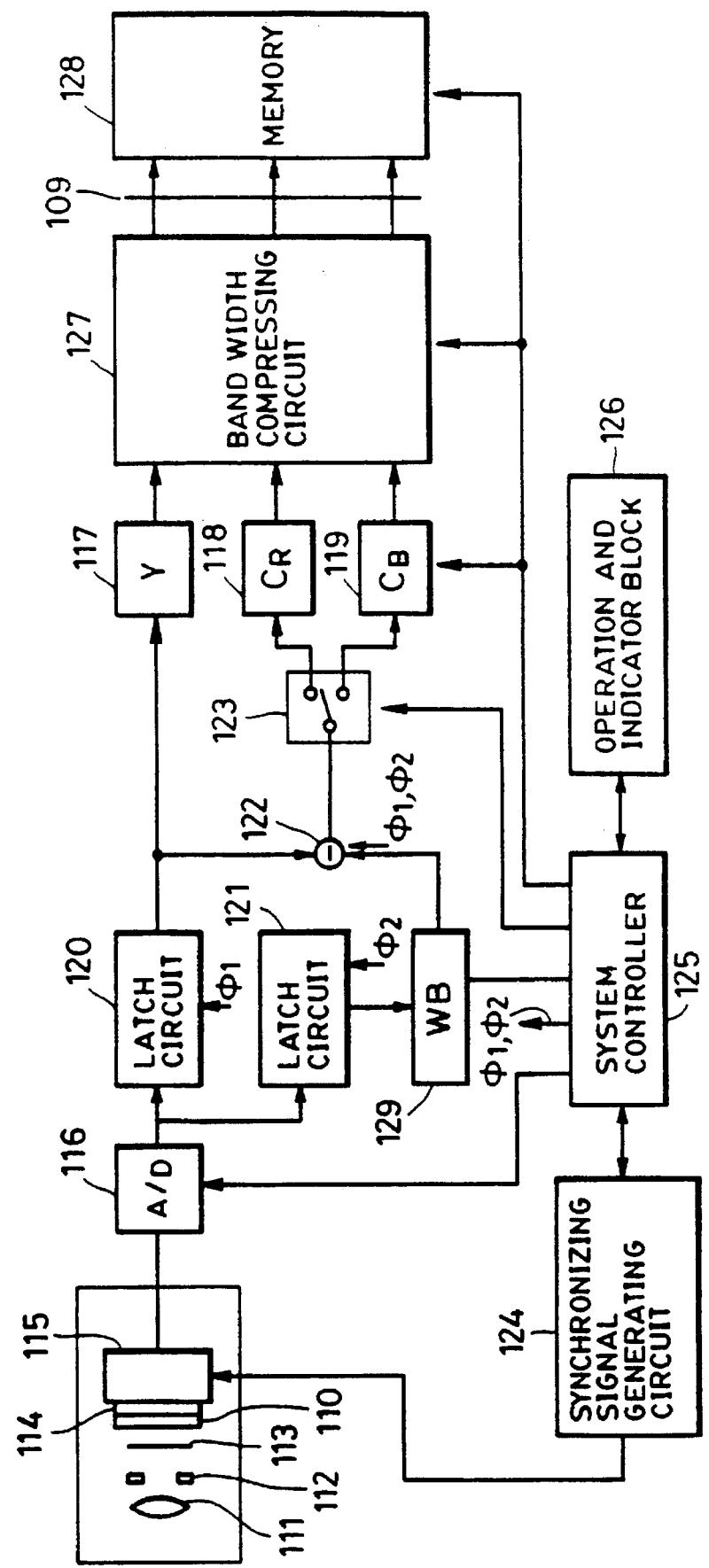
FIG. 11 illustrates a block diagram of the image signal processing apparatus of a second embodiment of the present invention.

FIG. 11 illustrates a second embodiment of the present invention.

An optical image passes through a lens 111, an aperture 112, and a shutter 113, is filtered by an optical low pass filter 110 and is further filtered to remove an infra-red component by an IR cut filter 114.

The light then impinges on an image pick-up device 115, which is for example an interline CCD, and which has a color filter as shown in FIG. 3. The color filter comprises a large number of color filter portions, each of which corresponds to a photo cell of the image pick-up device.

A synchronizing signal generating circuit 124 generates pulse signals to control the timing with which signals are read out from the image pickup device so as to scan a horizontal line in a TV horizontal period. Every alternate line is in one TV field period and the intervening lines scanned in the next TV field period, so that the read-out signals are in interlace form.

An A-to-D converter 116 converts the signal from the image pickup device 115 into a digital signal with a timing set by a clock signal from a system controller 125 so that the A-to-D conversion is synchronized with the signals for successive cells or pixels from the image pick-up device. When the filter pattern shown in FIG. 3 is used the A-to-D converter can digitize to a resolution of 8 bits, while when the filter pattern shown in FIG. 2 is used it is desirable to digitize to a resolution of at least 10 bits.

The output signal from the A-to-D converter 116 is latched by latch circuits 120 and 121 synchronously with respective clock signals $\phi_1$, $\phi_2$.

The clock signals $\phi_1$, $\phi_2$ each have a period twice that of the pulse signals from the synchronizing signal generating circuit, and are phase-inverted relative to each other. Therefore one latch circuit 120 latches the Y signal while the other latch circuit 121 latches the R or B signal. A Y memory 117 stores the output from latch circuit 120. The information stored is the same as for the offset sub-sampled signal of FIG. 10a.

The output signal from the latch circuit 121 is multiplied in a white balance block 129 by a ratio which is controlled by the system controller 125 so as to control the white balance between R and B. A subtractor 122 subtracts signals from the latch circuit 120 and the white balance block 129 synchronously with $\phi_1$ or $\phi_2$. Consequently, it produces R-Y or B-Y signals during each TV field period.

These R-Y, B-Y signals are selectively supplied to a CR memory 118 and a CB memory 119 by controlling a switching circuit 123 with the timing of a TV field sync signal. Consequently, the information stored in the memories 118 and 119 are the same as for the sub-sampled color signals of FIGS. 10b and 10c. The sampling phases for the stored CR and CB samples are controlled by clocks $\phi_1$, $\phi_2$ The clocks $\phi_1$ and $\phi_2$ do not need to be precisely 180° out of phase, provided that they are sufficiently out of phase to separate the Y signals from the color signals reliably.

A compressing circuit 127 compresses the band widths of the outputs of the memories 117–119 by, for example, DPCM or ADCT. The output signals from the compressing circuit 127 are stored in a memory 128 via an interface circuit 109.

An operation and indicator block 126 consists of operating switches operable by a user to control the apparatus and an indicator.

If the memory 128 has a relatively large capacity the compressing circuit 127, the Y memory 117, the CR memory 118, and the CB memory 119 can be eliminated and the output signals of the latch circuit 120 and the switch 123 can be supplied directly to the memory 128. Since the outputs of the latch circuit 120 and the switch 123 have the sub-sampling structure of FIG. 10, the bandwidth of the stored signal is one third that of a conventional system without sub-sampling, so that the capacity of the memory 128 is still less than is needed in that case. Additionally, the signal suffers less quality deterioration if the compressing circuit 127 is eliminated, and also suffers less deterioration compared with the signal obtained using the filter of FIG. 9 since no interpolation is required.

Figure 12:
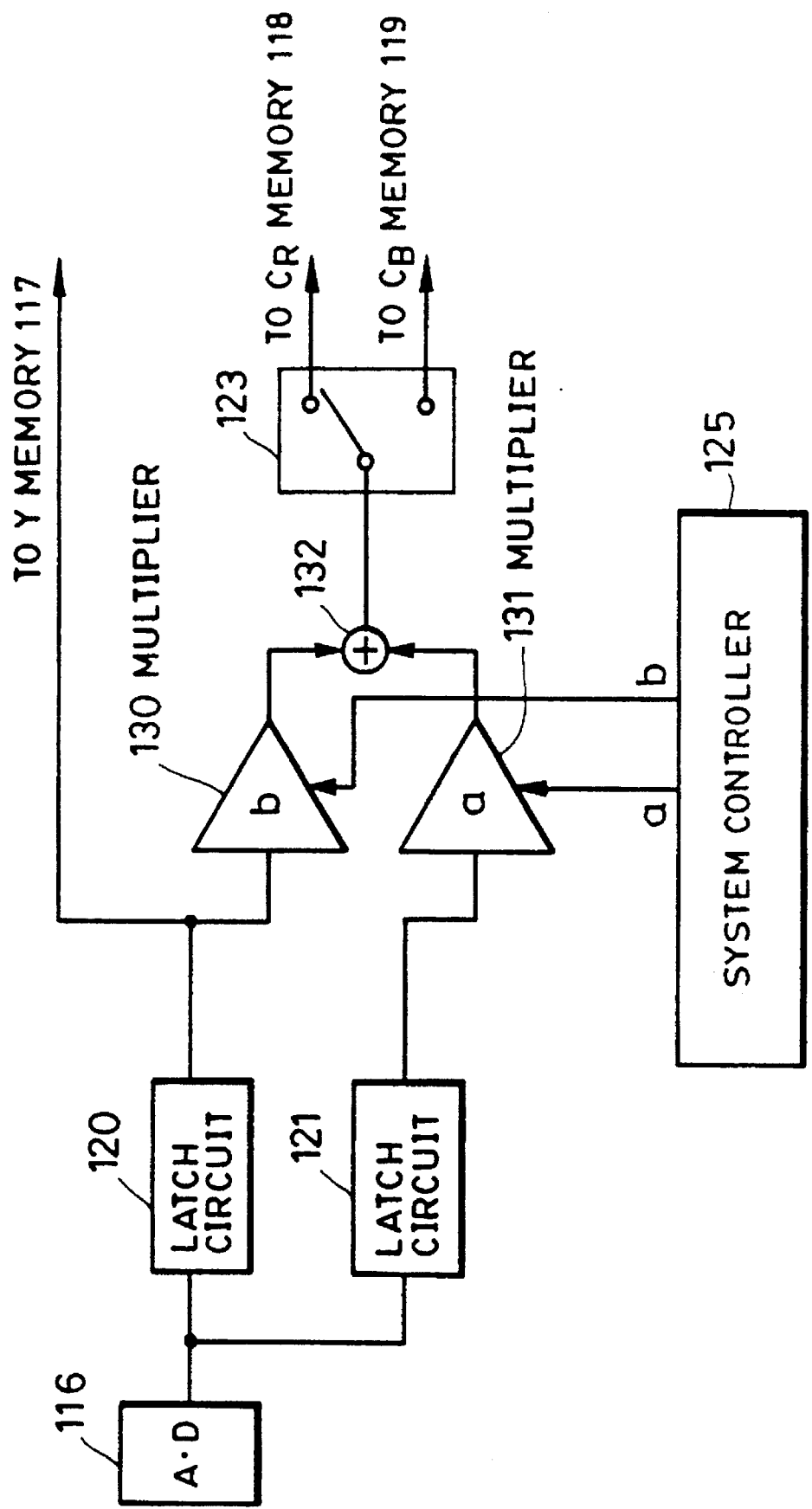
FIG. 12 illustrates an alternative for part of the diagram of FIG. 11.

If a color filter such as is shown in FIG. 2 is adopted, the subtractor 122 can be replaced by the circuit arrangement shown in FIG. 12. That is, if the filter shown in FIG. 2 is adopted R and B signals can be defined as follows:

$R=Y-kCy$ $B=Y-mYe$ (k, m are constants determined by the respective spectrum characteristics of the Cy and Ye filters), and the Y-R color difference signal for red can be defined as follows:

$Z=Y-grR$ (where Z is the color difference signal for red, and gr is a coefficient for controlling white balance)

So $Z = Y - gr(Y - k \cdot Cy)$
$= (1 - gr)Y + gr \cdot k \cdot Cy$

In FIG. 12 the Y signal from latch 120 is multiplied by a factor in a multiplier 130, and the R or B signal from the latch 121 is multiplied by a factor in a multiplier 131. The outputs of the multipliers 130, 131 are added in an adder 132.

Therefore if the gains a,b in the multipliers 130,131 are set so as to be b=1-gr, a=gr.k, the output signal of the adder 132 will be the red color difference signal Z.

In the same way, the color difference signal for blue can be obtained from the Y and Ye signals using different values for the factors a and b. The system controller 25 changes the factors a,b in each TV field period.

As mentioned above, the outputs of the Y signal latch 120 and the switch 123 have the sub-sampling structure shown in FIG. 10, even though no sub-sampling circuit is used. The sub-sampling structure in the signal arises in effect from the use of a memory and a color filter having the sub-sampling structure. Accordingly this embodiment can reduce the size and cost of the apparatus.

Figure 13:
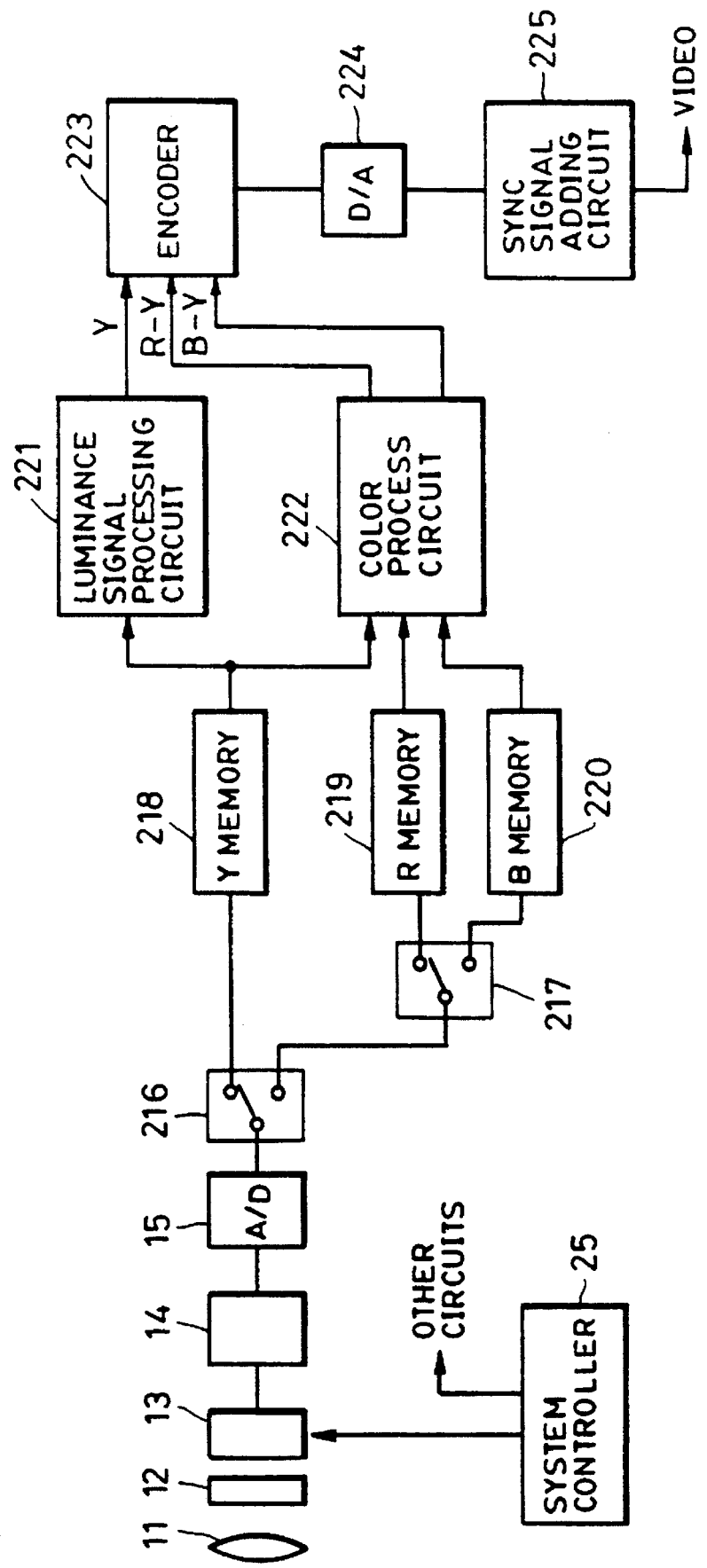
FIG. 13 illustrates a block diagram of a third embodiment of the present invention.

FIG. 13 illustrates a block diagram of a third embodiment of the present invention. In FIG. 13 blocks having the same reference numerals as in previous figures have the same functions.

An output signal from the A-to-D converter 15 is alternately supplied to a Y-memory 218 or a switch 217 by a switch 216 synchronously with clocks for reading out each cell signal of the image pickup device 13.

The Y signals are stored in the Y-memory 218 while the switch 217 changes its state for every TV field period, so that the R and B signals are respectively stored in R memory 219 and B memory 220.

Next, a luminance signal processing circuit 221 interpolates the signal and executes gamma conversion etc to generate a luminance signal.

Figures 14, 15:
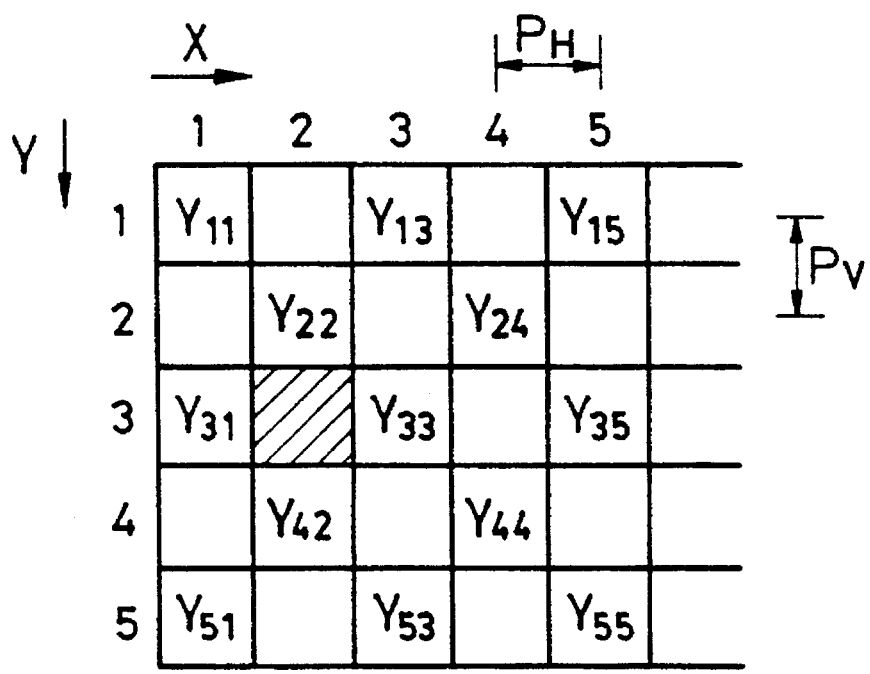
FIG. 14 illustrates locations of signals and the interpolation of a missing Y signal.
FIG. 15 illustrates another color filter suitable for use in the present invention.

For example, in FIG. 14 a pixel value Y32 is interpolated by performing the calculations:

$Y32=¼[Y31+Y22+Y33+Y42]$

In order to execute this calculation, missing Y signal pixel values are replaced by "0" when the signal stored in the memory 218 is read and then the Y signal is filtered by following convolution matrix:

$$\begin{bmatrix} 0 & 1/4 & 0 \\ 1/4 & 1 & 1/4 \\ 0 & 1/4 & 0 \end{bmatrix}$$

This matrix can be replaced to other 3×3 or 5×5 or 7×7 filter matrices, to perform other similar calculations.

A color processing circuit 222 processes R and B color signals from memories 219, 220 and the Y signal from memory 218 and produces R-Y, B-Y signal by firstly interpolating the Y, R and B signals with filters and then subtracting them.

An encoder 223 produces a standard TV signal such as a NTSC signal from the Y, R-Y, and B-Y signals from the processing circuits 221, 222.

This standard TV signal is converted into an analog signal by D-to-A converter 224 and then sync signals are added by a sync signal adding circuit 225.

The color filter 14 can be replaced by other types in which Y or G filter portions are located in an offset manner, such as the one shown in FIG. 15.

This image signal processing apparatus can be applied to, for example, a video camera, a TV, a monitor apparatus and a printer etc. When applied to a printer, the encoder, the D-to-A convertor, and the sync signal adder can be eliminated.

Embodiments of this invention can provide a high quality Y signal without false signals. This invention can be applied to not only the interline CCD but an interline transfer CCD or a X-Y address type image pick-up device or an image pickup tube.

Various further alternatives and modifications will be apparent to those skilled in the art.

What is claimed is:

1. An image signal processing apparatus comprising:

(a) image pickup means for photoconverting an optical image into a first image signal and a second image signal interlaced with said first image signal;

(b) color filter means disposed adjacent said image pickup means and having first filter portions for passing a predetermined spectrum component of the optical image, the first filter portions being disposed in an offset manner, with respect to each other, between interlaced lines; and (c) signal processing means for converting said first image signal and said second image signal into a first digital image signal and a second digital image signal, respectively, and for combining said first digital image signal and said second digital image signal to form a combined digital image signal.

2. Apparatus according to claim 1, wherein said first filter portions pass a luminance component.

3. Apparatus according to claim 1, wherein said first filter portions pass a green color component.

4. Apparatus according to claim 1, wherein said signal processing means includes interpolating means for interpolating a missing signal portion by using said first and second digital image signals.

5. Apparatus according to claim 4, wherein said interpolating means interpolates a luminance signal portion.

6. Apparatus according to claim 1, further comprising memory means for storing one of said first digital image signal and said second digital image signal.

7. Apparatus according to claim 1, wherein said color filter means comprises (i) second color filter portions for passing a second color component of the optical image, and (ii) third color filter portions for passing a third color component of the optical image.

8. Apparatus according to claim 1, wherein said color filter means comprises filter portions for passing one of red, green, and blue color components.

9. Apparatus according to claim 1, wherein said color filter means comprises filter portions for passing one of cyan, magenta, and yellow color components.

10. Apparatus according to claim 1, wherein said signal processing means comprises delay means for delaying at least a portion of said first digital image signal and said second digital image signal.

11. An image signal processing apparatus comprising:

(a) image pickup means for photoconverting an optical image into a first image signal and a second image signal interlaced with said first image signal;

(b) color filter means disposed adjacent said image pickup means and having first filter portions for passing a predetermined spectrum component of the optical image, the first filter portions being disposed in an offset manner, with respect to each other, between interlaced lines; and (c) signal processing means for converting said first image signal and said second image signal into a first digital image signal and a second digital image signal, respectively, and for interpolating said first digital image signal with said second digital image signal to form an interpolated first digital image signal.

12. Apparatus according to claim 11, wherein said first filter portions pass a luminance component.

13. Apparatus according to claim 11, wherein said first filter portions pass a green color component.

14. Apparatus according to claim 11, wherein said signal processing means interpolates a missing signal portion by using the second digital image signal.

15. Apparatus according to claim 14, wherein said interpolating means interpolates a luminance signal portion.

16. Apparatus according to claim 11, further comprising memory means for storing one of said first digital image signal and said second digital image signal.

17. Apparatus according to claim 11, wherein said color filter means comprises (i) second color filter portions for passing a second color component of the optical image, and (ii) third color filter portions for passing a third color component of the optical image.

18. Apparatus according to claim 11, wherein said color filter means comprises filter portions for passing one of red, green, and blue color components.

19. Apparatus according to claim 11, wherein said color filter means comprises filter portions for passing one of cyan, magenta, and yellow color components.

20. Apparatus according to claim 11, wherein said signal processing means comprises delay means for delaying at least a portion of said first digital image signal and said second digital image signal.

21. An image signal processing apparatus comprising:

image pickup means for photo-converting an optical image into a first image signal and a second image signal interlaced with the first image signal;

color filter means located in front of said image pickup means, having first filter portions for passing a predetermined spectrum component of the optical image, wherein the first filter portions are located in an offset manner, with respect to each other, between interlaced lines;

A-D conversion means for converting the first image signa and the second image signal into a first digital image signal and a second digital image signal, respectively; and digital signal processing means for interpolating the first digital image signal with the second digital image signal to form an interpolated digital image signal, said digital signal processing means comprising a digital filter composed of a plurality of delay elements and a plurality of amplifying elements.

22. An image signal processing apparatus according to claim 21, wherein the first filter portions pass a luminance component.

23. An image signal processing apparatus according to claim 21, wherein the first filter portions pass a green component.

24. An image signal processing apparatus according to claim 21, wherein said digital signal processing means interpolates a luminance signal portion.

25. An image signal processing apparatus according to claim 21, further comprising memory means for storing one of the first digital image signal and the second digital image signal.

26. An image signal processing apparatus according to claim 21, wherein said color filter means comprises second color filter portions for passing a second color component and third color filter portions for passing a third color component of the optical image.

27. An image signal processing apparatus according to claim 21, wherein said color filter means comprises filter portions for passing one of red, green, and blue components.

28. An image signal processing apparatus according to claim 21, wherein said color filter means comprises filter portions for passing one of cyan, magenta, and yellow components.

* * * * *

UNITED STATES PATENT AND TRADEMARK OFFICE
CERTIFICATE OF CORRECTION

PATENT NO. : 5,579,047
DATED : November 26, 1997
INVENTOR(S) : Taku Yamagami, et al.

It is certified that error appears in the above-indentified patent and that said Letters Patent is hereby corrected as shown below:

COLUMN 2

Line 27, "Consequently" should read --Consequently,--.

COLUMN 3

Line 47, "be" should be deleted.

COLUMN 5

Line 23, "36,37," should read --36, 37,--;

Line 24, "33,34," should read --33, 34,--.

COLUMN 7

Line 58, "Therefore" should read --Therefore,-- and "a,b" should read --a, b--;

Line 64, "a,b" should read --a, b--.

UNITED STATES PATENT AND TRADEMARK OFFICE
CERTIFICATE OF CORRECTION

PATENT NO. : 5,579,047
DATED : November 26, 1997
INVENTOR(S) : Taku Yamagami, et al.

It is certified that error appears in the above-indentified patent and that said Letters Patent is hereby corrected as shown below:

COLUMN 8

Line 17, "etc" should read --etc.--.

Signed and Sealed this

Twentieth Day of May, 1997

*Attest:*

BRUCE LEHMAN

*Attesting Officer*     Commissioner of Patents and Trademarks